July 21, 1964 R. K. HOSKIN 3,141,626

TAPE CONTROL SYSTEM FOR TAPE RECORDERS AND REPRODUCERS

Filed July 17, 1961 2 Sheets-Sheet 1

INVENTOR.
RICHARD K. HOSKIN
BY
Flam and Flam
ATTORNEYS.

July 21, 1964 R. K. HOSKIN 3,141,626

TAPE CONTROL SYSTEM FOR TAPE RECORDERS AND REPRODUCERS

Filed July 17, 1961 2 Sheets-Sheet 2

INVENTOR.
RICHARD K. HOSKIN
BY
Flam and Flam
ATTORNEYS

United States Patent Office 3,141,626

Patented July 21, 1964

3,141,626

TAPE CONTROL SYSTEM FOR TAPE RECORDERS AND REPRODUCERS

Richard K. Hoskin, Gardena, Calif., assignor to The Stancil-Hoffman Corporation, Hollywood, Calif., a corporation of California Filed July 17, 1961, Ser. No. 124,637

7 Claims. (Cl. 242—55.12)

This invention relates to a tape control system for tape recorders and reproducers.

Tape recorders customarily have positions corresponding to fast forward, rewind and drive. In an attempt to maintain the tape on the supply or takeup reels when the drive position is shifted, prior control systems provide braking positions between rewind and drive and between fast forward and drive. This arrangement in a sequence switch or single lever control has proved not entirely foolproof. If the lever or switch is moved quickly through the braking positions, the inertia of the reels still causes an unraveling of tape.

A closely related problem is that of maintaining an appropriate imbalance of braking forces on the supply and takeup spindles during braking conditions to ensure that the tape is neither broken nor permitted to unravel. Also important is the maintenance of proper tension during drive conditions.

The primary object of this invention is to provide an improved tape control system that automatically maintains proper tape tension, prevents unraveling or fracture whatever may be the manipulations of the selector switch. To accomplish this purpose, use is made of unique circuits for separate takeup and rewind motors together with simplified means sensing both speed and direction of motion of the tape. By a unique interlocking arrangement, braking is initiated, with proper tension controls, as soon as the selector switch leaves the position corresponding to takeup or rewind and continues to operate correspondingly until the tape is halted, whatever the interim positions of the selector switch may be.

Another object of this invention is to provide a unique electrical tape control system of this character utilizing a combination of dynamic braking and braking by D.C. current to achieve proper tension control.

Still another object of this invention is to provide novel, reliable and compact direction and speed sensing means, for use in a tape control system.

Still another object of this invention is to provide a system of this character that requires as moving parts in addition to the motors, selector switch and sensing means, only a simple relay.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings.

Figure 1:
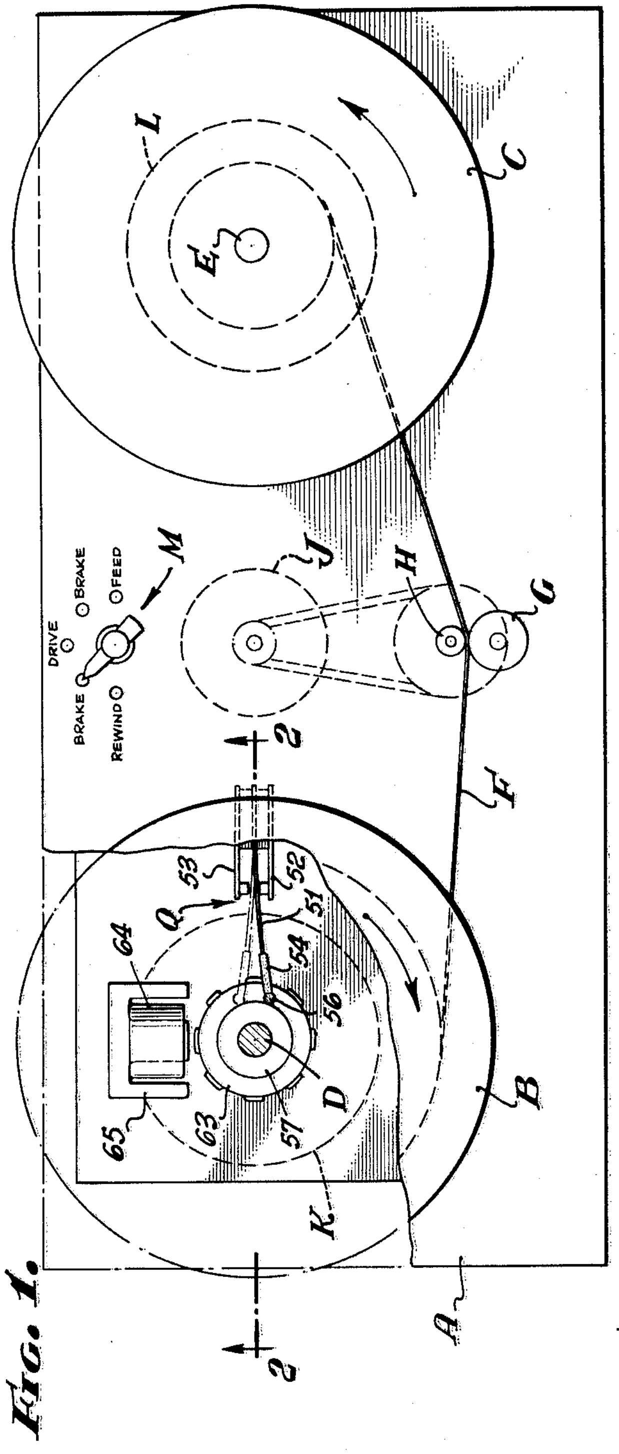
FIGURE 1 is a schematic diagram of a tape machine showing the tape reels, motors and sensing means.
Figure 2:
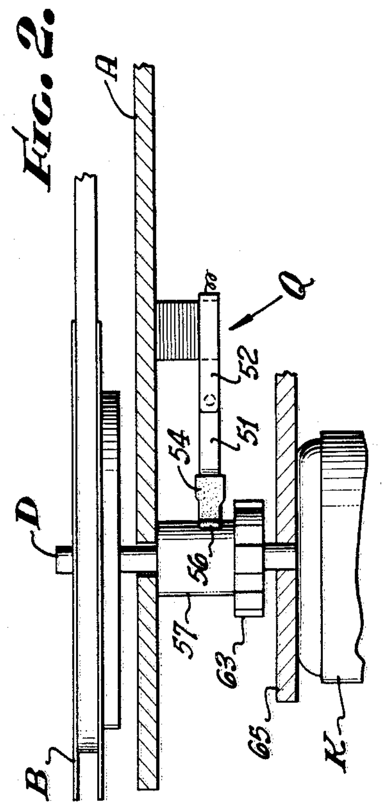
FIGURE 2 is a sectional view taken generally along a plane corresponding to line 2—2 of FIG. 1.

In FIGS. 1 and 2 there is diagrammatically illustrated a panel or plate A upon which supply and takeup reels B and C are mounted. Spindles D and E for the reels are provided. A tape F is shown extending between the supply and takeup reels in a conventional manner. The tape F passes a capstan G and a releasable pinch roller H used to hold the tape against the capstan G and control the tape speed during conditions of playback or recording.

For use in the present invention, three different motors J, K, and L are utilized. The motor J is a synchronous motor used during conditions of recording or playback to determine, within accurate limits, the speed of the pinch roller H and thus the speed of the tape. The motors K and L are small induction motors used to drive the supply and takeup spindles D and E in the arrow directions for rewind or feed respectively. In addition, and in a manner to be hereinafter described, the supply and takeup motors K and L are used to maintain appropriate tape tensions during various conditions of operation.

In order to select the mode of operation of the tape F, a selector switch M is provided, shown in this instance, mounted on the control panel A. The selector switch M has five positions sequentially arranged: rewind, brake, drive, brake and feed.

Figure 3:
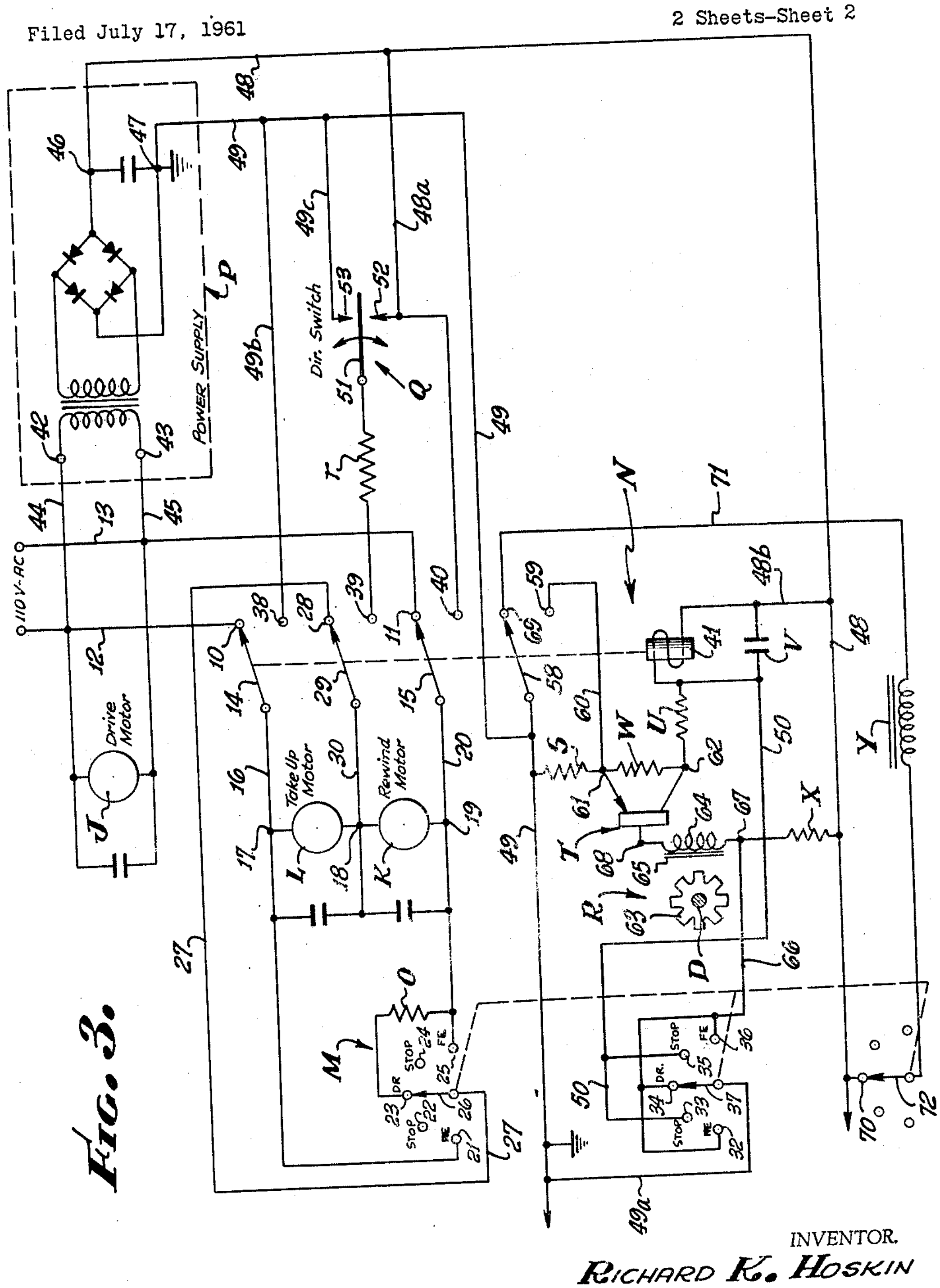
FIG. 3 is a wiring diagram.

In FIG. 3, the synchronous drive motor J and the spindle motors K and L are illustrated diagrammatically. During drive conditions the takeup motor L must be operated in order to wind up the tape, the speed of which is monitored by the drive motor J. In addition, tape tension must be provided in advance of the pinch roller H to prevent unraveling of the tape F. An adequate yielding force is provided by operating the rewind motor K at reduced excitation while the takeup motor is operated at greater excitation. The selector switch, when in drive position, accomplishes this result in cooperation with back contacts 10 and 11 of a relay N to be hereinafter described. The contacts 10 and 11 connect with A.C. supply lines 12 and 13, thus to form A.C. supply terminals. The takeup and rewind motors L and K connected in series are together connected across the A.C. supply terminals 10 and 11 by the aid of relay arms 14 and 15 engageable therewith. The circuit can be traced as follows: back contact 10, relay arm 14, lead 16, an outside terminal 17 of the takeup motor L, motor L, an inside terminal 18 common to the rewind motor K, motor K, an outside terminal 19 of the rewind motor K, a lead 20, and back contact 11 of the arm 15. Furthermore, the switch M causes the rewind motor K to be shunted by a resistor O so that most of the line voltage is developed across the takeup motor L.

The selector switch has several banks of contacts and switch arms for each bank operated in unison. Thus, the selector switch has one bank of five contacts 21–25 and a switch arm 26 for the motor circuits, and corresponding to rewind, brake, drive, brake, and feed. The switch arm 26 connects via lead 27 and back contact 28, relay arm 29 and lead 30 to the inside common motor terminal 18. In drive position, the arm 26 completes a circuit to the outside terminal 19 of motor K via resistor O. Thus, the shunt circuit can be traced as follows: inside terminal 18, lead 30, relay arm 29, contact 28, lead 27, switch arm 26, contact 23, lead 31, resistor O, lead 20 and outside motor terminal 19.

For conditions of fast rewind, the switch arm 26 engages contact 21 and shorts out the takeup motor L so that the entire line voltage is applied to the rewind motor K. At the same time, the resistor O is removed from shunt circuit relationship in that contact 23, upon which this shunt circuit is dependent, is disengaged. A circuit for operation of the rewind motor K can be traced as follows: back relay contact or supply terminal 10, relay arm 14, lead 16 (which connects to outside terminal 17 of motor L), contact 21, switch arm 26, lead 27, back contact 28, switch arm 29, leads 30, inside motor terminal 18 (thereby shorting the takeup motor L), rewind motor K, outside terminal 19, lead 20, relay arm 15 and back relay contact or supply terminal 11.

For conditions of fast feed, the opposite arrangement is achieved whereby the entire line voltage is applied to the takeup motol L, and the rewind motor K is shorted. The selector switch contact 25 thus connects directly to lead 20 for this purpose. The circuit can be traced as follows: back relay contact or supply terminal 11, relay arm 15, lead 20 (which is common to outside terminal 19 of motor K), selector switch contact 25, switch arm 26, lead 27, back relay contact 28, relay arm 29, lead 30, inside motor terminal 18 (thereby shorting the rewind motor K) takeup motor L, outside terminal 17, lead 16, relay arm 14, to supply terminal 10.

The short-circuited paths for the inactive motors provide dynamic braking adequate to maintain tape tension. In order to brake the takeup and rewind motors L and K appropriately and as the selector switch M is moved from a rewind or fast feed position to the central drive position, the takeup or rewind motors K and L may not only be shorted for dynamic braking, but they may also be more heavily braked by D.C. current to provide a very positive braking force. The relay N is provided for this purpose. Operating with the relay N are a D.C. power supply P, a direction sensing switch Q, a speed responsive device R, a second bank of switch contacts 32–36, a switch arm 37, and other current elements to be presently described.

The relay N accomplishes the disconnection of the takeup and rewind motors L and K from the A.C. supply lines, and places them in a braking circuit. For this purpose, the relay N has front contacts 38, 39 and 40 engaged for relay operation by arms 14, 29 and 15, which connect with motor terminals 17, 18 and 19. The power supply P not only provides the requisite D.C. braking current as required, but also is used to operate the coil 41 of the relay N. The power supply P has input terminals 42 and 43 connected via leads 44 and 45 to the A.C. supply lines, and output terminals 46 and 47 driving D.C. supply lines 48 and 49, the latter being ground or common.

When the selector switch arm 37 is in either brake or stop position a circuit is established for operating relay coil 41 as follows: ground lead 49, lead branch 49*a*, switch arm 37, contact 33 or 35, a lead 50 to one terminal of the relay coil 41 and via coil 41 to supply lead 48. If at the time the selector switch M is moved to a braking position, the takeup motor L was just previously operating at full speed, then, in order quickly to bring the tape to a halt without snapping the tape, a heavy braking force is applied to the rewind motor K and a lighter braking force is applied to the previously operating takeup motor L. Due to the heavy braking on the rewind motor K, the tape F will be quickly brought to a halt, and, due to the relatively lighter braking force on the takeup motor L, the inertia of the takeup motor can be spent without snapping the tape F. Contrariwise, if, at the time the selector switch is moved to braking position, the rewind motor K was just previously operating at full speed, then a heavy braking force is applied to the takeup motor L while a lighter braking force is applied to the rewind motor K. A heavy braking force is applied in each instance by sending a D.C. current to the motors K or L while the other motor L or K is short circuited for dynamic braking. The direction sensing switch Q automatically short circuits the appropriate motor while the supply leads 48 and 49 are connected across the outside motor terminals. The supply lead 49 via branch 49*b* connects to the front contact 38, and via arm 14 to the outside motor terminal 17 of the rewind motor L, and the other supply lead 48 connects via branch 48*a* to front contact 40, and, via arm 15, to the outside terminal 19 of the takeup motor L. The inside motor terminal 18 may either be connected to either outside motor terminal 17 or 19, but in dependence upon the relay N being operated. For this purpose, the lead 30 from the inside motor terminal 18 connects via relay arm 29, front relay contact 39 and resistor *r*, to an arm 51 of the sensing switch Q. The arm 51 is conductively associated with one of the two D.C. power leads 48 and 49 that connects with motor terminals 19 or 17. Contacts 52 and 53 on opposite sides of the arm 51 connect via lead branches 48*a* and 49*c* to leads 48 and 49. The arm 51 engages one of the two contacts 52 or 53 depending upon the direction of movement of the tape F so that the appropriate motor L or K is heavily braked while the other is shorted for dynamic braking. If the tape F is advancing, the contact 53 is engaged, whereas if the tape F is rewinding, the opposite contact 52 is engaged. Thus, if the tape is advancing, the takeup motor L is shorted via the following circuit: outside terminal 17, lead 16, relay arm 14, front contact 38, lead branch 49*b*, lead 49, lead branch 49*c*, contact 53, switch arm 51, resistor *r*, front contact 39, relay arm 29, lead 30 to inside motor terminal 18. The resistor *r* has a small ohmic value, and limits the circulating current to an appropriate value. The rewind motor K is then connected directly across power leads 48 and 49, the lead 48 connecting directly to outside motor terminal 19, and the inside motor terminal being connected to the other power lead via the short circuit path just described.

If the tape is rewinding, a short circuit path across the rewind motor K and a dynamic braking circuit for the takeup motor L can correspondingly be traced. Thus, the dynamic braking circuit for the takeup motor L can be traced as follows: power lead 49, branch lead 49*b*, front relay contact 38, relay arm 14, lead 16, outside motor terminal 17, takeup motor L, inside motor terminal 18, lead 30, relay arm 29, front relay contact 39, current limiting resistor *r*, switch arm 51, contact 52, branch lead 48*a* to power supply lead 48. The short circuited path for the rewind motor K can be traced as follows: outside motor terminal 19, lead 20, relay arm 15, front relay contact 40, branch lead 48*a*, contract 52, switch arm 51, current limiting resistor *r*, front relay contact 39, relay arm 29, lead 30 to the inside motor terminal 18.

The manner in which direction sensing switch Q is operated may be explained with reference to FIG. 1. The arm 51 is a flexible leaf spring of suitable resilient material that extends generally radially of the axis of the supply spindle D, the outer end being anchored. At the free inner end of the arm is mounted a cap 54 made of rubber or suitable electrical insulation material, the outer end of the cap 54 having a recess accommodating a snubber 56 of foam plastic material. The snubber 56 frictionally engages a sleeve 57 mounted on the spindle D. Assuming that the spindle D is rotating in the arrow direction, and corresponding to fast rewind, the switch arm occupies the full line tangent position. In this position, the drag force upon the switch arm is in a direction along the switch arm 51 away from its anchored end. The switch arm 51 accordingly stays in such position. Upon reversal of the direction of motion of the spindle, then the sleeve imposes a frictional force on the snubber 56 now directed toward the anchored end of the arm 51. The arm 51 is buckled until it is carried over center and then to the phantom line position whereupon the motion of the sleeve 57 provides a force direction away from the anchored end of the switch arm.

Accordingly, the switch arm 51 moves between opposite limits and to opposite contacting positions in accordance with the direction of movement of the tape F. In order to ensure such results, the switch arm is of such size that it must necessarily be buckled or compressed to store a slight amount of energy so that it is stable only in the full-line or phantom positions illustrated.

Satisfactory operation of the tape recorder depends upon the tape F being brought to a complete stop before the braking operation is interrupted. Otherwise, the tape may be snapped, or it may unravel. While the brake contacts 33 and 35 of the selector switch are interposed between rewind and drive and drive and feed, inattentive operation may result in the selector being placed on drive or feed position before a just previously operating rewind motor K is stopped. Accordingly, the selector switch M must be incapable of causing deenergization of the relay N if the tape F is in motion. By interposing the braking contacts 33 and 35 between opposite sides of the drive contact, it is, of course, ensured that relay N must at least be momentarily energized upon movement of the selector switch M from rewind to drive, or from fast feed to drive. A circuit for sustaining current to the relay coil is established from the power supply lead 49, a fourth relay arm 58, front relay contact 59, lead 60 (all paralleled by a resistor S to be hereinafter described), one terminal 61 of a controllable, variable impedance device or switch T (in this instance a transistor), terminal 62 current limiting resistor U (protecting transistor T), relay coil 41, branch lead 48*b* to the other power supply lead 48. This circuit is dependent only on the variable impedance device T and is independent of the selector switch M.

The variable impedance device or transistor T permits a substantial current flow through the circuit just described only in response to motion of the tape F. For this purpose, the speed sensing unit R is used to control the transistor T.

The sensing unit R constitutes a generator, in this instance in the form of a toothed rotor 63, atttached to the spindle D just beneath the sleeve 57. The toothed rotor 63 sweeps across a non-rotary pickup coil 64 mounted upon a suitable magnetic frame 65, in turn secured directly or indirectly to the panel A. When the rotor is turning, an alternating current is generated in the pickup coil 64. This alternating current, if adequate, saturates the transistor T and thus places the transistor in its low impedance state. Thus, assuming the relay N has been operating by prior positioning of the switch arm 37 at contact 33 or 35, and that the switch arm 37 has been prematurely moved to engagement with contact 32, 34, or 36, and further assuming that the tape F is still operating at a significant speed, then a control circuit for the transistor T can be traced as follows: contact 32, 34, or 36 as the case may be, a lead 66 common to all of the contacts 32, 34 and 36, terminal 67, pickup coil 64, base terminal 68 of transistor T, transistor T to emitter terminal 61, lead 60, contact 59, arm 58, branch lead 49*a* (via power supply lead 49), switch arm 37 back to contact 32, 34 or 36. The generating coil 64 is then effective during one half of its cycle irrespective of the direction of movement of tape F to apply the requisite saturating current, and the power circuit for relay coil 41 is established as previously described.

When the speed reduces to a small yet finite value, then a saturating current cannot be produced. At such time, the relay N would drop out but for a condenser V which shunts the relay coil, thus introducing a time delay corresponding to that normally required for the spindle to reduce its speed to zero. When the relay N drops out, the switch arm 26 regains control of the operation of the motors L and K.

A relatively high value resistor W shunts the transistor power terminals 61 and 62 and allows a small bleeder current to pass through the relay coil 41. This bleeder current by itself is inadequate even to hold the relay N in its attracted position. However, it assists the action of the condenser V in delaying relay dropout. Hence the size of the condenser V can be reduced. The speed sensing pickup coil is effective only to hold the relay N attracted, and then only when the selector switch M is in drive, rewind or feed position. The front relay contact 59 ensures the former function, and the common contacts 32, 34 and 36 ensures the latter function. The resistor S which parallels the relay arm 58 and front contact 59, while relatively small, yet is large enough to act as an open circuit as far as the small generating coil 64 is concerned.

It is possible for the selector switch M to be moved to a position in which the switch arm 37 is intermediate adjacent contacts and not in conductive engagement with any of them. To prevent the braking action, once initiated, from being interrupted, and furthermore to transfer control to the sensing unit R with relay arm 58 in front contacting position as the switch is moved to contact 32, 34 or 36, the relay coil 41 is provided with a holding circuit. The holding circuit is interrupted when the arm 37 engages any one of the contacts 32, 34 or 36 to yield control to the speed sensing device R, but is operable as soon as the arm 37 moves to any intermediate position. Thus a saturating control current is sent through the transistor T so that a holding circuit is provided for the relay 41 that operates independently of the lead 50 and the contacts 33 and 35. Thus this base control circuit can be traced as follows: power supply lead 49, relay arm 58, front contact 59, lead 60, terminal 61, and via the transistor T to base terminal 68, coil 64, an isolating resistor X to the other power supply lead 48. The relay N remains operative when the switch M moves to any intermediate contacting position from either contact 33 or 35.

When the switch arm 37 engages either rewind or feed contact 32, 34 or 36, the current from line 48 and resistor X is shunted from the base 68 directly to the ground lead 49. The shunt path extends from terminal 67 to lead 66, contact 32, 34 or 36 as the case may be, contact arm 37, lead 49*a* to the ground lead 49. The coil 64, however, remains in circuit with the base of transistor T to exert its control.

In order to clutch the tape F and the drive motor J, a pinch solenoid Y is provided for operating the pinch roller H only when braking is completed and when the selector switch M is in drive position. For this purpose, a circuit established for the pinch solenoid Y via a back contact of the relay N and a contact 70 in a third bank of contacts of the selector switch M as follows: power supply lead 49, switch arm 58, back relay contact 69, lead 71, switch arm 72, contact 70 to power supply lead 48.

The inventor claims:

1. In a control system for a machine having a supply spindle and a takeup spindle for tape, wire or like material; drive means for operating the supply spindle in a rewind direction; drive means for operating the takeup spindle in a feed direction; drive means for slowly advancing the material; a selector having positions corresponding to rewind, brake, drive, and feed; the positions being so arranged that the selector must be moved through braking position to arrive at drive position from either rewind or feed position; a switching device having a first state and a second state, and having electrically energizable means for positioning the device in its first state, the said switching device being positioned in its second state upon deenergization of said electrically energizable means; circuit means for operating said drive means in accordance with the position of said selector and dependent upon said two state device being in its second state; circuit means for braking said material and dependent upon said two state device being in its first state; an energization circuit for said electrically energizable means and operable upon movement of said selector to brake position; an alternate energization circuit for said electrically energizable means including a controllable device having a high impedance state and a low impedance state; means operative in response to predetermined speed of said material and dependent upon the two state device being in its first state for causing the controllable device to pass energy to said electrically energizable means via said alternate energization circuit.

2. The combination as set forth in claim 1 together with a capacitor shunting said electrically energizable means for delaying the deenergization thereof.

3. The combination as set forth in claim 1 together with a capacitor shunting said electrically energizable means; said electrically energizable means being operable only upon passage of adequate current thereto; and means for constantly passing a current through said electrically energizable means that is less than said adequate current.

4. In a control system for a machine having a supply spindle and a takeup spindle for tape, wire or like material; drive means for operating the supply spindle in a rewind direction; drive means for operating the takeup spindle in a feed direction; drive means for slowly advancing the material; a selector having positions corresponding to rewind, brake, drive, and feed; the positions being so arranged that the selector must be moved through braking position to arrive at drive position from either rewind or feed position; a switching device having a first state and a second state, and having electrically energizable means for positioning the device in its first state, the said switching device being positioned in its second state upon deenergization of said electrically energizable means; circuit means for operating said drive means in accordance with the position of said selector and dependent upon said two state device being in its second state; circuit means for braking said material and dependent upon said two state device being in its first state; an energization circuit for said electrically energizable means and operable upon movement of said selector to brake position; an alternate energization circuit for said electrically energizable means including a controllable device having a high impedance state and a low impedance state; means operative in response to predetermined speed of said material and dependent upon the two state device being in its first state for causing the controllable device to pass energy to said electrically energizable means via said alternate energization circuit; and means operative only when the selector is between positions for energizing said electrically energizable means.

5. In a control system for a machine having a supply spindle and a takeup spindle for tape, wire or like material; drive means for operating the supply spindle in a rewind direction; drive means for operating the takeup spindle in a feed direction; drive means for slowly advancing the material; a selector switch having successive contacting positions corresponding to rewind, brake, drive, brake, and feed; a relay having an operating coil; a circuit for operating said supply spindle drive means only when the relay is deenergized and when the selector switch is in rewind contacting position; a circuit for operating said takeup spindle drive means only when the relay is deenergized and when the selector switch is in feed contacting position; a circuit for operating said material advancing drive means only when the relay is deenergized and when the selector switch is in drive contacting position; brake means operative when the relay is energized; an energization circuit for said coil operative when the selector switch is in brake contacting position; an alternate energization circuit for said coil, including a transistor; said transistor having a base and an emitter and collector in circuit with said coil; and a control circuit for said transistor including in closed circuit a generating coil operative to produce a saturating current in response to predetermined motion of said material, the base, the emitter, and relay contacts, of the selector switch when in drive, rewind or feed position.

6. The combination as set forth in claim 5 together with a capacitor shunting said relay coil for delaying its deenergization.

7. The combination as set forth in claim 5 together with a pair of power supply leads, circuit means for completing an auxiliary control circuit through said transistor base and emitter independently of said relay contacts, said selector switch shunting said emitter and base from said auxiliary control circuit when said selector switch is in any of said contacting positions.

References Cited in the file of this patent

UNITED STATES PATENTS

| | | |
|---|---|---|
| 2,775,407 | Elliott et al. | Dec. 25, 1956 |
| 2,806,658 | Truesdale | Sept. 17, 1957 |
| 2,873,318 | Moore | Feb. 10, 1959 |
| 2,923,488 | Gratian et al. | Feb. 2, 1960 |
| 2,938,677 | Flan et al. | May 31, 1960 |

FOREIGN PATENTS

| | | |
|---|---|---|
| 714,748 | Great Britain | Sept. 1, 1954 |

OTHER REFERENCES

R.C.A. Technical Notes No. 261, June 1959, R. F. Maine et al. (2 sheets).